(12) United States Patent
Sariel et al.

(10) Patent No.: US 10,949,111 B2
(45) Date of Patent: Mar. 16, 2021

(54) UPDATING OPERATING SYSTEM IMAGES OF INACTIVE COMPUTE INSTANCES

(71) Applicant: Red Hat Israel, Ltd., Raanana (IL)

(72) Inventors: David Sariel, Raanana (IL); Arie Bregman, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 94 days.

(21) Appl. No.: 16/202,227

(22) Filed: Nov. 28, 2018

(65) Prior Publication Data

US 2020/0167094 A1 May 28, 2020

(51) Int. Cl.
| | |
|---|---|
| G06F 3/06 | (2006.01) |
| G06F 8/65 | (2018.01) |
| G06F 9/4401 | (2018.01) |
| G06F 9/455 | (2018.01) |

(52) U.S. Cl.
CPC .......... *G06F 3/0647* (2013.01); *G06F 3/0604* (2013.01); *G06F 3/067* (2013.01); *G06F 8/65* (2013.01); *G06F 9/4418* (2013.01); *G06F 9/45541* (2013.01)

(58) Field of Classification Search
CPC ...... G06F 3/0647; G06F 3/0604; G06F 3/067; G06F 8/65; G06F 9/4418; G06F 9/45541
See application file for complete search history.

(56) References Cited

U.S. PATENT DOCUMENTS

| | | | |
|---|---|---|---|
| 6,226,667 B1 * | 5/2001 | Matthews | ............. G06F 9/4416 709/203 |
| 8,185,884 B2 | 5/2012 | Sudhakar | |
| 8,205,194 B2 | 6/2012 | Fries et al. | |
| 8,839,228 B2 | 9/2014 | Thorat et al. | |
| 9,286,046 B2 * | 3/2016 | Androncik | ................ G06F 8/61 |
| 9,477,504 B2 | 10/2016 | Benedetti et al. | |
| 10,120,695 B2 * | 11/2018 | Cool | ...................... G06F 9/4406 |
| 2004/0153733 A1 * | 8/2004 | Lin | ...................... G06F 11/1417 714/6.12 |

(Continued)

FOREIGN PATENT DOCUMENTS

CN          102999369 B      8/2016

OTHER PUBLICATIONS

Author Unknown, "Update Offline Virtual Machine with PowerShell and WSU Offline Update: Part 1," blogs. technet.microsoft.com/heyscriptingguy/2015/03/17/update-offline-virtual-machine-with-powershell-and-wsus-offline-update-part-1/, Mar. 17, 2015, Microsoft, 6 pages.

(Continued)

*Primary Examiner* — Ziaul A Chowdhury
(74) *Attorney, Agent, or Firm* — Withrow & Terranova, PLLC

(57) ABSTRACT

Updating inactive compute instances is disclosed. It is determined that a first compute instance that boots from an operating system image on a first storage device is in an inactive state. It is determined that updates to the operating system image on the first storage device exist. The operating system image is copied from the first storage device to a second storage device. The operating system image on the second storage device is updated with the updates to generate an updated operating system image on the second storage device. The updated operating system image is copied form the second storage device to the first storage device in place of the operating system image.

17 Claims, 6 Drawing Sheets

(56) References Cited

U.S. PATENT DOCUMENTS

| | | | | |
|---|---|---|---|---|
| 2005/0289533 | A1* | 12/2005 | Wang | G06F 21/57 717/168 |
| 2007/0180206 | A1* | 8/2007 | Craft | G06F 11/1466 711/162 |
| 2008/0104588 | A1* | 5/2008 | Barber | G06F 8/63 718/1 |
| 2010/0192143 | A1* | 7/2010 | Ingle | H04L 67/06 717/172 |
| 2013/0132950 | A1* | 5/2013 | McLeod | G06F 9/45558 718/1 |
| 2014/0108774 | A1* | 4/2014 | Bennah | G06F 11/3051 713/2 |
| 2014/0325140 | A1* | 10/2014 | Haug | G06F 9/4401 711/112 |
| 2019/0171435 | A1* | 6/2019 | Pande | G06F 8/65 |

OTHER PUBLICATIONS

Luebbe, Jan, et al., "RAUC Documentation," Release v0.4, Sep. 25, 2018, 91 pages.

\* cited by examiner

UPDATING OPERATING SYSTEM IMAGES OF INACTIVE COMPUTE INSTANCES

TECHNICAL FIELD

The examples relate generally to updating compute instances, such as bare metal machines and/or virtual machines, and particularly to updating operating system images of inactive compute instances.

BACKGROUND

A compute instance, such as a bare metal machine and/or a virtual machine, periodically require operating system updates to the operating system image from which the compute instance boots, or initiates. There are circumstances under which a compute instance may be inactive, such as being physically powered off or logically marked as not being available for service for a period of time, during which time period multiple operating system updates may be released by the vendor of the operating system. When the compute instance next initiates, or otherwise returns to service, the number of operating system updates that have accumulated over the period of time may then be consecutively installed.

SUMMARY

The examples disclosed herein include mechanisms for updating operating system images of inactive compute instances to eliminate the delay that otherwise occurs when a plurality of pending operating system updates are installed to an operating system image after the compute instance transitions from an inactive state to an active state.

In one example a method is provided. The method includes determining that a first compute instance that boots from an operating system image on a first storage device is in an inactive state. The method further includes determining that updates to the operating system image on the first storage device exist. The method further includes copying the operating system image from the first storage device to a second storage device. The method further includes updating the operating system image on the second storage device with the updates to generate an updated operating system image on the second storage device. The method further includes copying the updated operating system image from the second storage device to the first storage device in place of the operating system image.

In another example a computing device is provided. The computing device includes a memory and a processor device coupled to the memory. The processor device is to determine that a first compute instance that boots from an operating system image on a first storage device is in an inactive state. The processor device is further to determine that updates to the operating system image on the first storage device exist. The processor device is further to copy the operating system image from the first storage device to a second storage device. The processor device is further to update the operating system image on the second storage device with the updates to generate an updated operating system image on the second storage device and copy the updated operating system image from the second storage device to the first storage device in place of the operating system image.

In another example a non-transitory computer program product stored on a computer-readable storage medium is provided. The computer program product includes instructions to cause a processor device to determine that a first compute instance that boots from an operating system image on a first storage device is in an inactive state. The instructions further cause the processor device to determine that updates to the operating system image on the first storage device exist. The instructions further cause the processor device to copy the operating system image from the first storage device to a second storage device. The instructions further cause the processor device to update the operating system image on the second storage device with the updates to generate an updated operating system image on the second storage device, and copy the updated operating system image from the second storage device to the first storage device in place of the operating system image.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
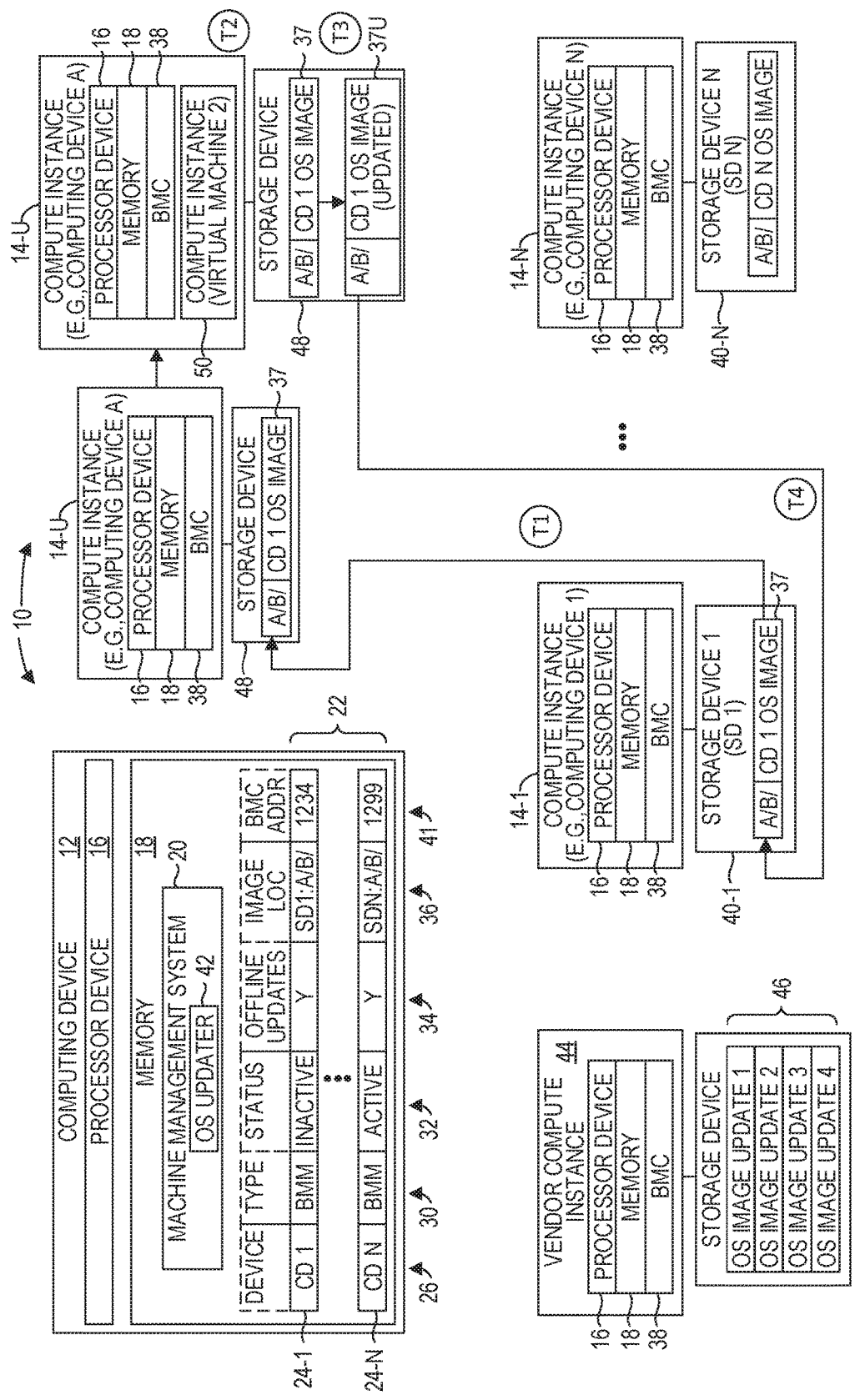
FIG. 1 is a block diagram of an environment in which mechanisms for updating operating system images of inactive compute instances may be implemented.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first compute instance" and "second compute instance," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified.

A compute instance, such as a bare metal machine and/or a virtual machine, periodically require operating system updates to the operating system image from which the compute instance boots, or initiates. There are circumstances under which a compute instance may be inactive, such as being physically powered off or logically marked as not being available for service for a period of time, during which time period multiple operating system updates may be released by the vendor of the operating system. When the compute instance next initiates, or otherwise returns to service, the number of operating system updates that have accumulated over the period of time may then be consecutively installed. It may take a substantial amount of time to apply the operating system updates, resulting in a substantial delay before the compute instance is actually available to provide a desired service.

This can be a particular problem, for example, in large data centers such as those of cloud computing environment providers, where compute instances are allocated on an on-demand basis. Such environments may have thousands of compute instances, some of which may be placed in an inactive state for relatively long periods of time due to lack of demand. During the long period of time, the vendor of the operating system may issue many operating system updates. When the compute instance is next initiated, the compute instance must first be updated with the large number of updates that accumulated over the period of time, causing a substantial delay before the compute instance can actually provide the desired services. This substantial period of delay results in user dissatisfaction.

The examples disclosed herein include mechanisms for updating operating system images of inactive compute instances to eliminate the delay that otherwise occurs when a plurality of pending operating system updates are installed on an operating system image of a compute instance after the compute instance transitions from an inactive state to an active state.

In particular, the examples disclosed herein access information that identifies whether a compute instance is in an active state or an inactive state. If the compute instance is in an inactive state, the examples may access information that indicates whether the operating system image of the compute instance should be automatically updated while in the inactive state. If the information indicates that the operating system image of the compute instance should be automatically updated while in the inactive state, the examples cause the operating system image of the compute instance to be updated. When the compute instance subsequently transitions from the inactive state to active state, the compute instance can relatively rapidly provide the desired services because the operating system image of the compute instance is already up to date, eliminating the delay that typically accompanies the operating system update process.

Among other advantages, the disclosed examples facilitate an improvement to computer functionality by implementing updates to operating system images of compute instances during periods of inactivity, eliminating what otherwise can be a substantial delay in providing services in an ad-hoc environment, such as, by way of non-limiting example, a cloud computing environment or other large data center environment. The disclosed examples are thus directed to a non-abstract improvement in computer functionality.

FIG. 1 is a block diagram of an environment 10 in which examples disclosed herein may be practiced. The environment 10 includes a compute instance 12 that periodically or intermittently monitors a plurality of compute instances 14-1 through 14-N (generally, compute instances 14). A compute instance 14, as discussed herein, refers to a discrete runtime environment, and may comprise a bare metal machine (BMM) (i.e. a physical machine) configured to run an operating system, or may comprise a virtual machine (VM) that runs on a BMM and that emulates a BMM. A VM typically runs a guest operating system in conjunction with a virtual machine monitor, such as a hypervisor, that is configured to coordinate access to physical resources of a BMM, such as a memory and a processor device, by the VMs running on the BMM. Thus, each VM has access to at least a portion of the physical resources of the BMM, including access to a processor device and memory. It is transparent to an application executing in a VM that the application is running in a VM versus a BMM. A compute instance 14 thus, whether a BMM or a VM, includes at least a portion of a memory and a processor device. While for purposes of illustration two compute instances 14 are illustrated, the environment 10 may in practice have tens, hundreds, or thousands of compute instances 14. In some examples, the compute instances 14 may be part of a cloud computing environment. For simplicity and clarity, networks and communication paths have been omitted from FIG. 1; however, each of the compute instances 12,14, as well as other components depicted in FIG. 1 may be communicatively coupled to one another via one or more networks or other communication mechanisms to facilitate communications among such components.

Each of the compute instances 12, 14 include a processor device 16 and a memory 18. The compute instance 12 includes a machine management system 20 that maintains a data structure 22 that stores information regarding each compute instance 14. The machine management system 20 may comprise any suitable machine management system; however, in some examples, the machine management system 20 comprises the Red Hat® Openstack® management system modified in accordance with the examples disclosed herein. In this example the data structure 22 includes a plurality of rows 24-1-24-N (generally rows 24), each row 24 corresponding to one of the compute instances 14. Each row 24 includes a plurality of data fields that contain information about the corresponding compute instance 14. As an example, the row 24-1 includes a compute instance identifier field 26 that contains a compute instance identifier of the compute instance 14-1. A type field 30 identifies the type of compute instance 14-1, in this example a BMM. The state field 32 contains a current state of the compute instance 14-1. In this example, the current state can be either "active" which means that the compute instance 14-1 is not in a state suitable for updating, or "inactive" which indicates that the compute instance 14-1 is in a state suitable for updating. As currently indicated in the row 24-1, the compute instance 14-1 is in an inactive state. The inactive state may mean that the compute instance 14-1 is powered down (e.g. shut down), or, in the case of a VM, powered down, or otherwise not running, or may reflect a logical state wherein the machine management system 20 has indicated that the compute instance 14-1 is currently not assigned to a user (e.g., suspended).

The row 24-1 includes an automatic update indicator field 34 that contains information indicating whether the compute instance 14-1 is to receive automatic operating system updates. In this example, the automatic update indicator field 34 indicates (e.g., "Y") that the compute instance 14-1 is to receive automatic operating system updates. The row 24-1 includes an image location field 36 that contains information that identifies the location of the operating system image from which the compute instance 14-1 boots. In this example, the image location field 36 identifies the location of the operating system (OS) image 37 of the compute instance 14-1 as being located on a storage device 40-1.

In some examples, one or more of the compute instances 14 include a baseboard management controller (BMC) 38. A BMC 38 monitors one or more corresponding compute instances 14 and can perform certain functions with respect to such compute instances 14. The BMC 38 may communicate with other devices, such as the compute instance 12, via a protocol such as the intelligent platform management interface (IPMI) protocol. The machine management system 20 can interact with a BMC 38 to, for example, obtain information about any compute instances 14 with which the BMC 38 is associated. The machine management system 20 may also communicate with a BMC 38 to, for example, power on or power off a compute instance 14, or power on or power off a storage device associated with a compute instance 14.

The row 24-1 includes a BMC address field 41 that contains an address of the corresponding BMC 38 that is associated with the compute device 14-1. The machine management system 20 may use the BMC address in the BMC address field 41 to communicate with the BMC 38 of the compute instance 14-1. The row 24-N includes the same fields 26, 30, 32, 34, 36 and 41 discussed above with respect to the row 24-1. The information in such fields, however, pertains to the compute instance 14-N rather than the compute instance 14-1. In particular, the compute instance identifier field 26 of the row 24-N contains a compute instance identifier of the compute instance 14-N; the type field 30 of the row 24-N indicates the type of compute instance 14-N, which, in this example indicates that the compute instance 14-N is a BMM; the state field 32 indicates the current state of the compute instance 14-N, which, in this example indicates that the compute instance 14-N is in an active state and thus cannot be updated; the update indicator field 34 indicates that the compute instance 14-N is to receive automatic operating system updates; the image location field 36 of the row 24-N contains information that indicates that the operating system image of the compute instance 14-N is located on a storage device 40-N; and the BMC address field 41 identifies an address of the BMC 38 of the compute instance 14-N.

An operating system (OS) updater 42 periodically, or intermittently, scans the rows 24 of the data structure 22 to identify compute instances 14 that have an inactive state. If a compute instance 14 has an inactive state, the OS updater 42 determines whether operating system updates exist for the respective compute instance 14. The OS updater 42 may make this determination in any number of ways. In some examples, the data structure 22 may maintain a current version identifier that identifies the operating system version of a respective compute instance 14, and the OS updater 42 may communicate with a vendor compute instance 44 associated with a vendor of the operating system to determine whether operating system updates exist to that particular operating system version. Alternatively, the OS updater 42 may communicate with the respective compute instance 14 and obtain information that identifies a current version level of the operating system of the compute instance 14.

If a row 24 of the data structure 22 indicates that the corresponding compute instance 14 is in the inactive state, and if the OS updater 42 determines that operating system updates exist for the corresponding compute instance 14, then the OS updater 42 accesses the automatic update indicator field 34 to determine whether operating system updates are to be applied automatically to the corresponding compute instance 14. If so, the OS updater 42 causes the operating system of the compute instance 14 to be updated with the operating system updates. While the process for updating operating systems of inactive compute instances is necessarily described herein in some order of operations, it should be apparent that the order of operations is not importance so long as any step is not dependent on the preceding step. For example, the OS updater 42 may first simply check the automatic update indicator field 34 of each row 24 to determine whether operating system updates are to be applied automatically to the corresponding compute instance 14, and if not, move to the next row 24 even prior to determining the current state of the compute instance 14, or the OS updater 42 may first check both the automatic update indicator field 34 and the determine the current state of the compute instance 14 before determining whether any operating system updates exist for the compute instance 14. Thus, it is apparent that the examples disclosed herein may be performed in any number of different sequence of steps.

As an example of updating an operating system image of an inactive compute instance 14, assume that the OS updater 42 accesses the row 24-1 of the data structure 22. The OS updater 42 accesses the state field 32 and determines that the compute instance 14-1 is in an inactive state. The OS updater 42 accesses the automatic update indicator stored in the automatic update indicator field 34 and determines that operating system updates are to be applied to the compute instance 14-1. The OS updater 42 determines the current operating system version of the compute instance 14-1, and for purposes of illustration, assume that the OS updater 42 determines, based on the current operating system version of the OS image 37, that one or more updates to the OS image 37 of the compute instance 14-1 exist. For example, the OS updater 42 contacts the vendor compute instance 44 and determines, based on the current version of the operating system image 37 on the storage device 40-1, that three updates 46 should be applied to the operating system image 37 to bring the operating system image 37 up to date.

The OS updater 42 utilizes a separate compute instance 14-U to update the operating system image 37. In particular, the OS updater 42 copies the OS image 37 from the storage device 40-1 associated with the compute instance 14-1 to a storage device 48 of the compute instance 14-U. If the compute instance 14-1 and/or storage device 40-1 are powered down, the OS updater 42 may first send an instruction to the BMC 38 of the compute instance 14-1 to power up the storage device 40-1. After the storage device 40-1 is powered up, the OS updater 42 copies the OS image 37 from the storage device 40-1 to the storage device 48 at time T1. Increasingly, computing environments utilize fast disks with relatively small internal delay, such as solid-state disk (SSD) drives, and the copy of the OS image 37 from the storage device 40-1 to the storage device 48 may take relatively little time. At time T2 the OS updater 42 causes the initiation of a VM compute instance 50 on the compute instance 14-U. The VM compute instance 50 is directed to boot from the OS image 37 on the storage device 48. After the VM compute instance 50 initiates, the OS updater 42 initiates the update of the operating system image 37 on the storage device 48 to generate an updated OS image 37U. At a time T4, the OS updater 42 replaces the operating system image 37 of the storage device 40-1 with the updated OS image 37U by copying the updated OS image 37U on top of the operating system image 37. Thus, when the compute instance 14-1 next boots, the compute instance 14-1 will boot from the updated OS image 37U and will not need to install the three updates 46, eliminating the delay that would otherwise occur while the three updates 46 are installed on the operating system image 37.

Figure 2:
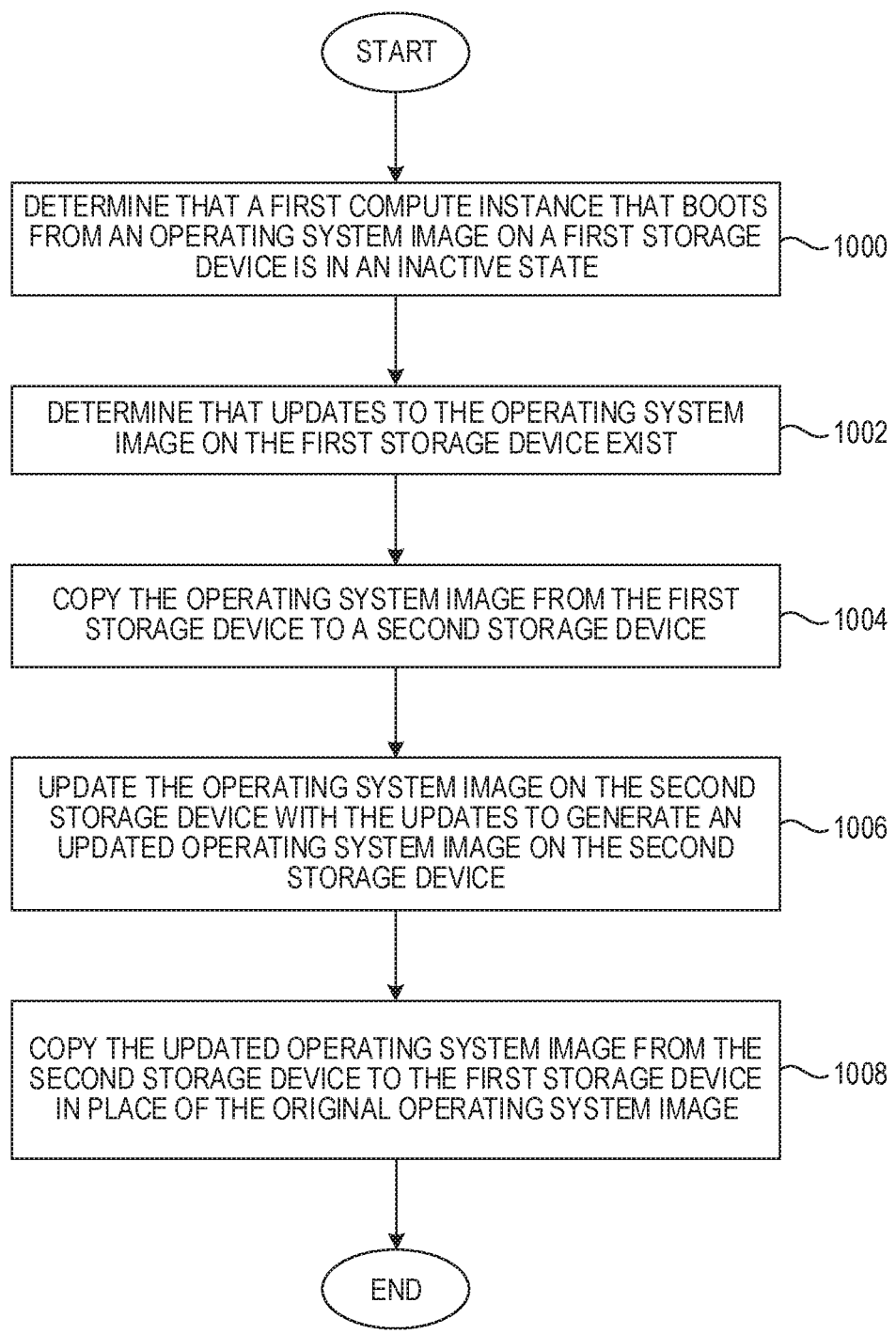
FIG. 2 is a flowchart of a method for updating an operating system images of an inactive compute instance according to one example.

FIG. 2 is a flowchart of a method for updating the operating system image of active compute instances 14 according to one example. FIG. 2 will be discussed in conjunction with FIG. 1. The OS updater 42 determines that the compute instance 14-1, which boots from the operating system image 37 on the storage device 40-1, is in an inactive state (FIG. 2, block 1000). The OS updater 42 determines that updates 46 to the operating system image 37 on the storage device 40-1 exist (FIG. 2, block 1002). The OS updater 42 copies the operating system image 37 from the storage device 40-1 to the storage device 48 (FIG. 2, block 1004). The OS updater 42 updates the operating system image 37 on the storage device 48 with the updates 46 to generate an updated operating system 37U on the storage device 48 (FIG. 2, block 1006). The OS updater 42 may cause the operating system image 37 to be updated via a mechanism associated with the particular operating system image 37. For example, in a Linux environment, the OS updater 42 may issue a YUM update command to a package manager of the running operating system of the virtual machine compute instance 50 after the virtual machine compute instance 50 boots from the operating system image 37. After the operating system image 37 has been updated to the operating system image 37U, the OS updater 42 copies the updated operating system image 37U from the storage device 48 to the storage device 40-1 in place of the operating system image 37 (FIG. 2, block 1008).

Because the OS updater 42 is a component of the compute instance 12, functionality implemented by the OS updater 42 may be attributed to the compute instance 12 generally. Moreover, in examples where the OS updater 42 comprises software instructions that program the processor device 16 of the compute instance 12 to carry out functionality discussed herein, functionality implemented by the OS updater 42 may be attributed herein to the processor device 16.

Figure 3:
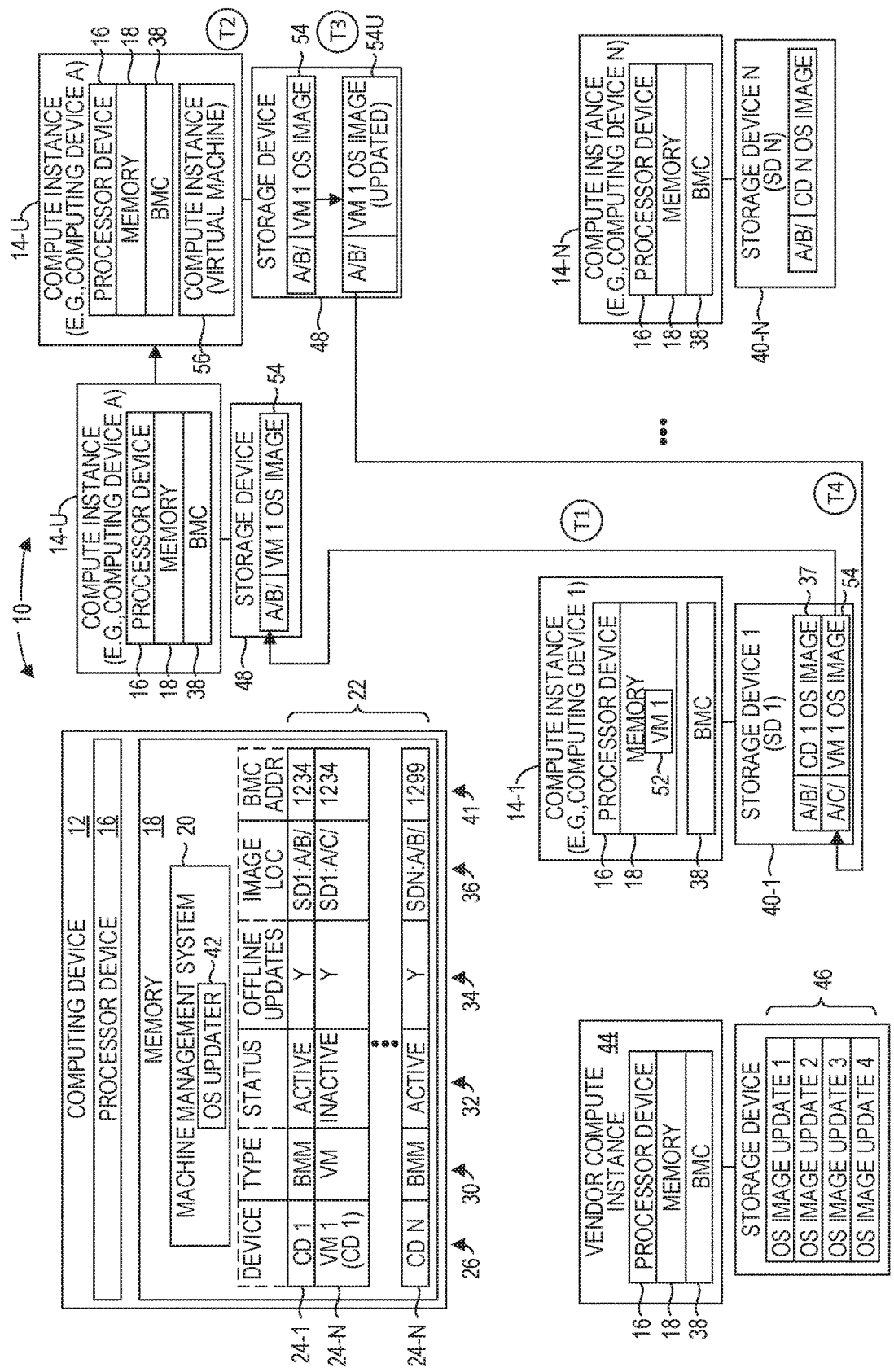
FIG. 3 is a block diagram of the environment according to another example.

FIG. 3 is a block diagram of the environment 10 according to another example. In this example, the compute instance 14-1 includes a VM compute instance 52 that boots from an OS image 54. The data structure 22 includes a row 24-2 that corresponds to the VM compute instance 52. The row 24-2 indicates that the VM compute instance 52 is a virtual machine type compute instance, currently has an inactive state, and should be updated with any operating system updates when inactive. The row 24-2 also indicates that the operating system image of the VM compute instance 52 is located on the storage device 40-1.

The OS updater 42 traverses the data structure 22 and accesses the row 24-2. The OS updater 42 determines that the VM compute instance 52, which boots from the operating system image 54 on the storage device 40-1, is in an inactive state based on the state field 32. For a VM this may mean that the VM compute instance 52 is not currently running, or has been logically marked as being inactive. The OS updater 42 determines the version of the operating system image 54, communicates with the vendor compute instance 44, and determines that updates 46 to the operating system image 54 exist. The OS updater 42 copies the operating system image 54 from the storage device 40-1 to the storage device 48. The OS updater 42 updates the operating system 54 on the storage device 48 with the updates 46 to generate an updated operating system 54U on the storage device 48. In particular, in this example, the OS updater 42 causes the initiation of a VM compute instance 56 on the compute instance 14-1 that initiates from the OS image 54. The OS updater 42 then issues a YUM update command to the VM compute instance 56 which causes an update of the operating system image 54. In some examples, prior to copying the updated operating system image 54U back to the storage device 40-1, the OS updater 42 accesses the state field 32 of the row 24-2 of the data structure 22 to confirm that the VM compute instance 52 remains in an inactive state prior to the copy. If the state of the VM compute instance 52 had changed from inactive to active during the update process on the compute instance 14-U, the OS updater 42 may cancel the update of the OS image 54.

After the operating system image 54 has been updated to the updated operating system image 54U, the OS updater 42 copies the updated operating system image 54U from the storage device 48 to the storage device 40-1 in place of the operating system 54. When the VM compute instance 52 is next initiated, the VM compute instance 52 initiates from the updated operating system image 54U instead of the operating system image 54 and is immediately available to provide desired services because the operating system image 54 need not be updated.

Figure 4:
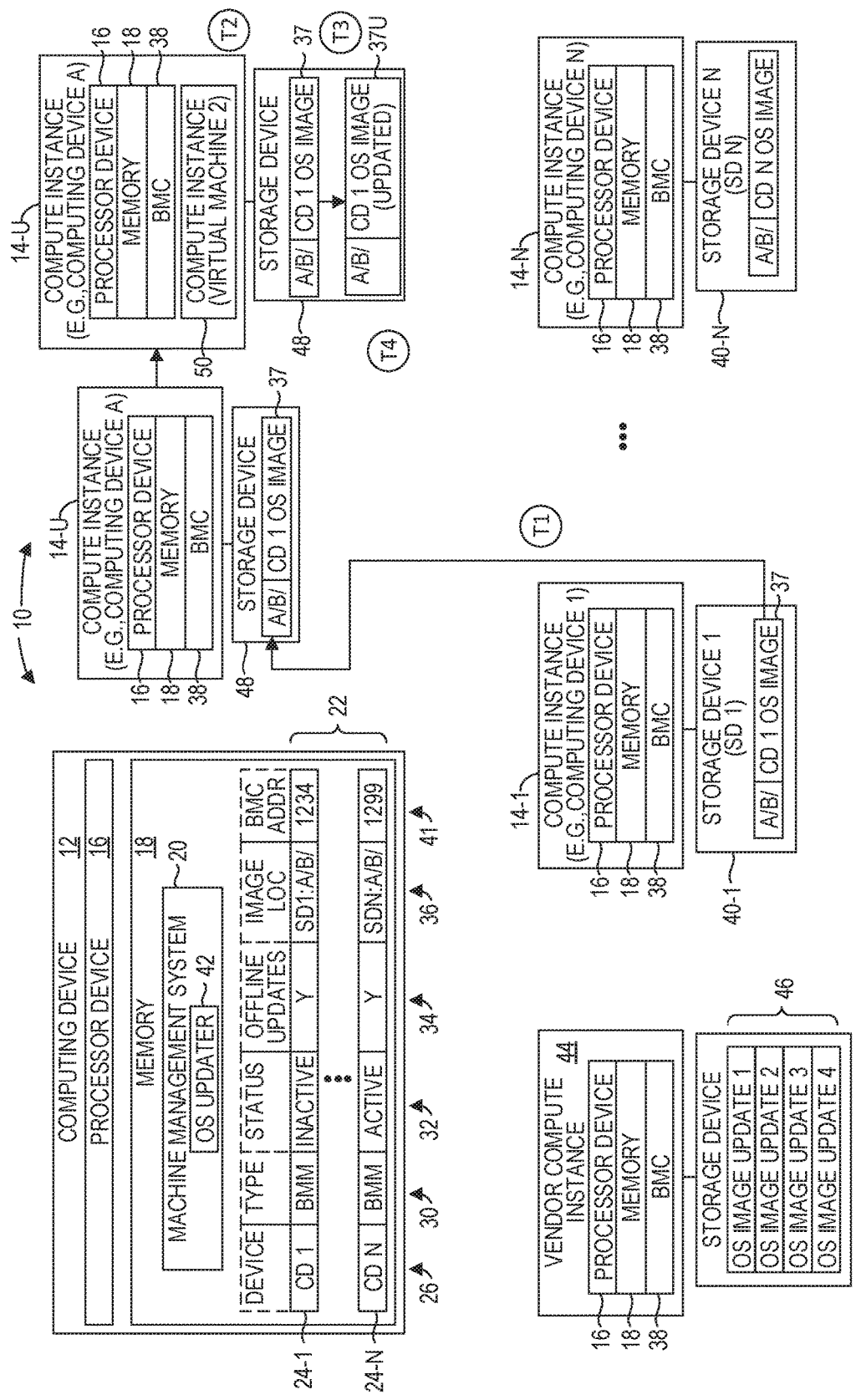
FIG. 4 is a block diagram of the environment according to another example.

FIG. 4 is a block diagram of the environment 10 according to another example. In this example, after the OS updater 42 copies the OS image 37 from the storage device 40-1 to the storage device 48, and the OS updater 42 periodically accesses the row 24-1 of the data structure 22 to ensure that the compute instance 14-1 remains in an inactive state. The OS updater 42 may verify state at any periodic interval, such as every second, every five seconds, or the like. If the state of the compute instance 14-1 changes from the inactive state to the active state, the OS updater 42 may terminate the update of the operating system image 37. Alternatively, in some examples, the OS updater 42 may estimate a remaining amount of time to completion of the update of the operating system image 37. If the estimated amount of time to completion is less than a predetermined threshold, the OS updater 42 may continue with the update process. In this example, the state of the compute instance 14-1 remains inactive during the majority of the update process. However, at the time T4, after the updated operating system image 37U has been generated, the OS updater 42 determines that the state of the compute instance 14-1 has changed from inactive to active. In response, the OS updater 42 terminates the update of the operating system image 37.

In some examples, logical locks may be used to ensure that the machine management system 20 does not allow a compute instance 14 to transition from the inactive state to the active state while the OS updater 42 is updating the operating system image of the compute instance 14. For example, prior to initiating the update, the OS updater 42 may set an update-in-progress flag contained in the corresponding row 24 (not illustrated). After the OS updater 42 has successfully updated the operating system image, the OS updater 42 resets the update-in-progress flag. Prior to transitioning a compute instance 14 from the inactive state to the active state, the machine management system 20 checks the update-in-progress flag, and, if set, does not transition the compute instance 14 from the inactive state to the active state. In an alternate embodiment, in such circumstances, the machine management system 20 sends a communication to the OS updater 42 indicating that the machine management system 20 would like to transition the compute instance 14 from the inactive state to the active state. The OS updater 42 may make a determination to cancel the operating system image update, reset the update-in-progress flag, and reply that the machine management system 20 can immediately transition the compute instance 14 from the inactive state to the active state. Alternatively, the OS updater 42 may make a determination to continue with the operating system image update, and reply that the machine management system 20 cannot transition the compute instance 14 from the inactive state to the active state. This determination can be made on any suitable criterion or criteria, such as based on the particular stage of the update process, an estimated remaining amount of time of completion, or the like. Such criterion or criteria may be user-configurable in some examples.

Figure 5:
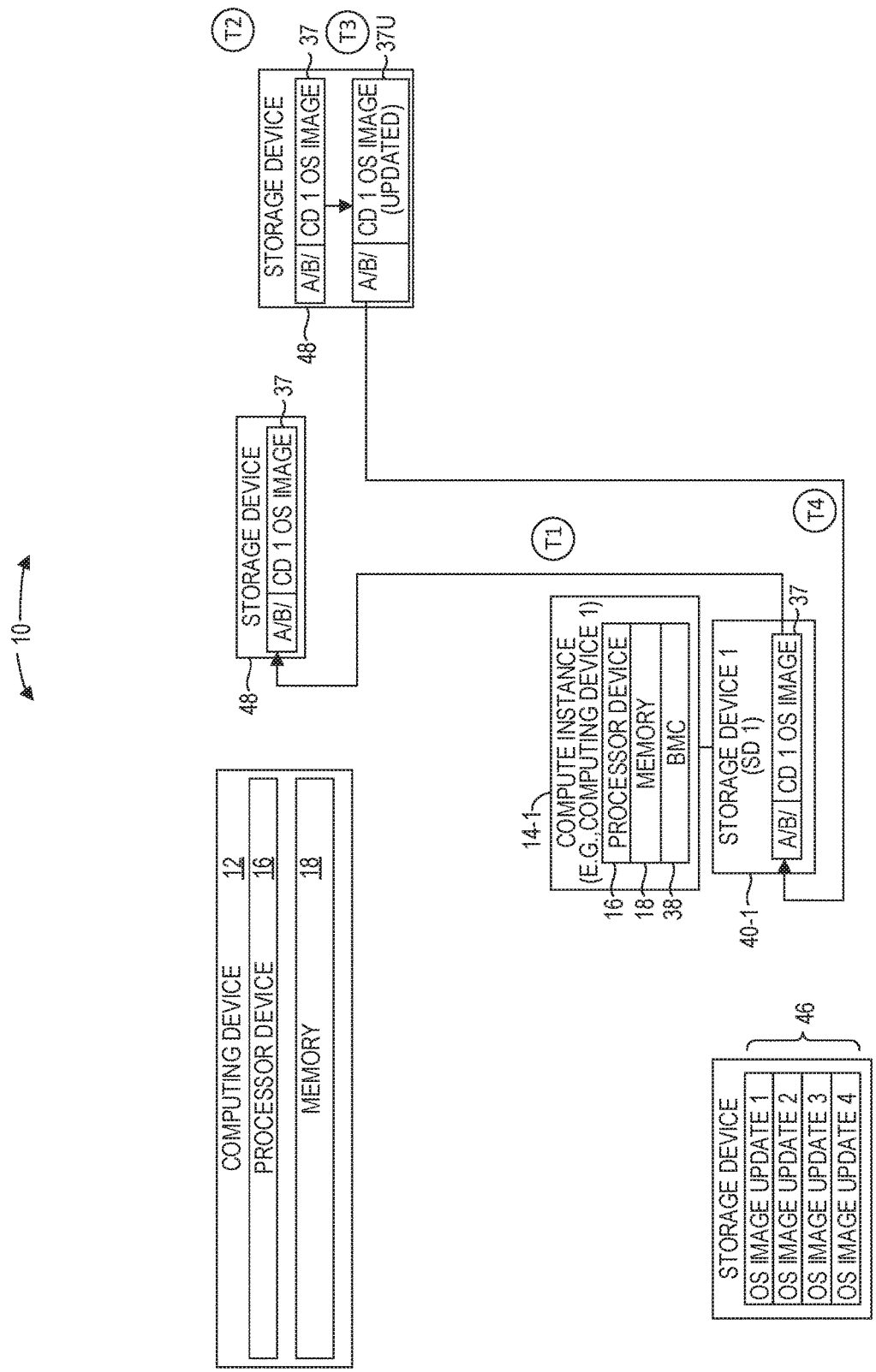
FIG. 5 is a simplified block diagram of the environment illustrated in FIG. 1 according to one example.

FIG. 5 is a simplified block diagram of the environment 10 according to one example. The compute instance 12 includes the memory 18 and the processor device 16 coupled to the memory 18. The processor device 16 is to determine that the compute instance 14-1 that boots from the operating system image 37 on the storage device 40-1 is in the inactive state. The processor device 16 is further to determine that updates 46 to the operating system image 37 on the storage device 40-1 exist. The processor device 16 is further to copy the operating system image 37 from the storage device 40-1 to the storage device 48. The processor device 16 is further to update the operating system image 37 on the storage device 48 with the updates 46 to generate the updated operating system image 37U on the storage device 48. The processor device 16 is further to copy the updated operating system from image the second storage device to the first storage device in place of the operating system image 37.

Figure 6:
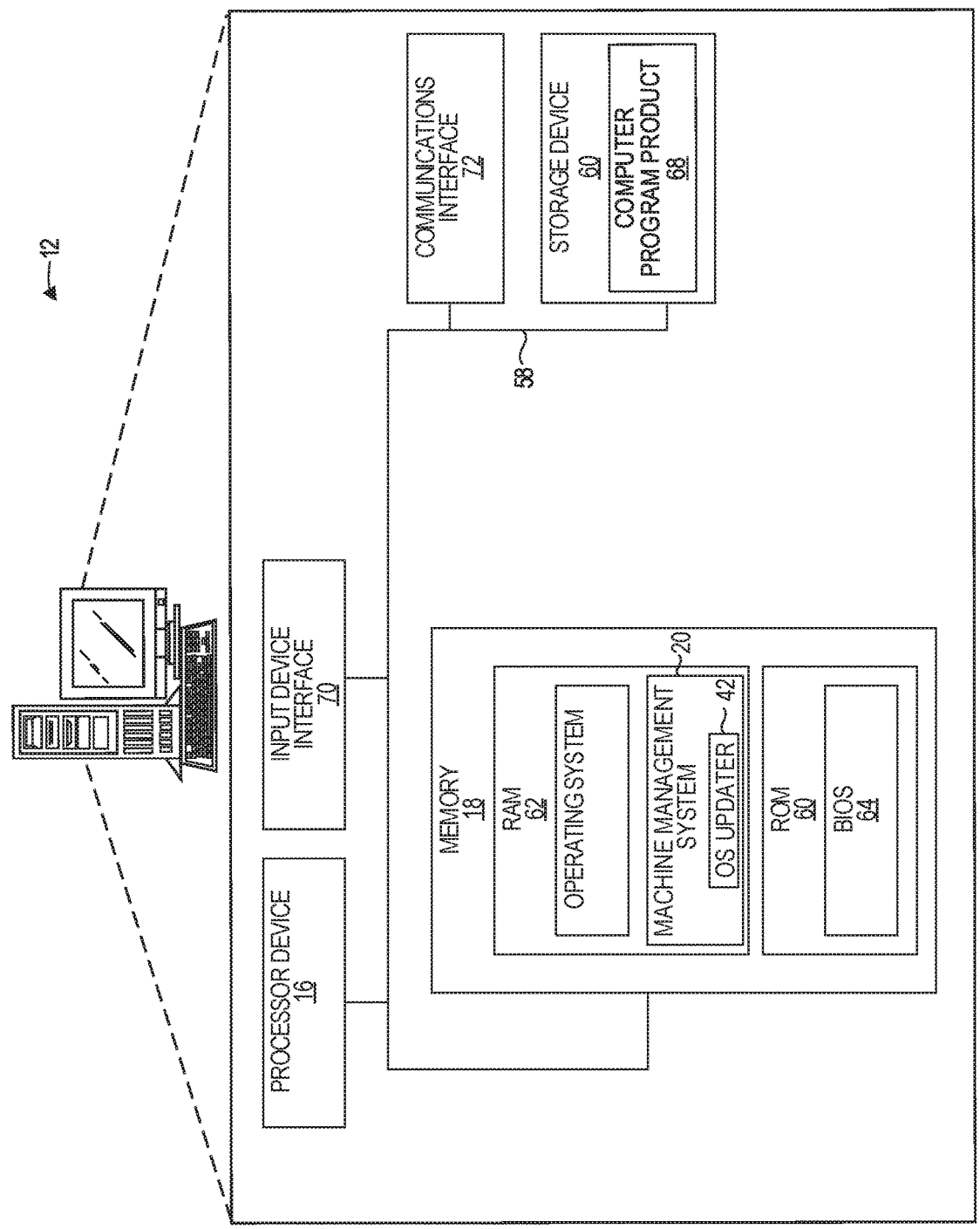
FIG. 6 is a block diagram of a computing device suitable for updating operating system images of inactive compute instances according to one example.

FIG. 6 is a block diagram of the compute instance 12 suitable for implementing examples according to one example. The compute instance 12 may comprise any computing or electronic device capable of including firmware, hardware, and/or executing software instructions to implement the functionality described herein, such as a computer server, a desktop computing device, a laptop computing device, or the like. The compute instance 12 includes the processor device 16, the memory 18, and a system bus 58. The system bus 58 provides an interface for system components including, but not limited to, the memory 18 and the processor device 16. The processor device 16 can be any commercially available or proprietary processor device such as, by way of non-limiting example, processor devices available from Intel Corporation or AMD.

The system bus 58 may be any of several types of bus structures that may further interconnect to a memory bus (with or without a memory controller), a peripheral bus, and/or a local bus using any of a variety of commercially available bus architectures. The memory 18 may include non-volatile memory 60 (e.g., read-only memory (ROM), erasable programmable read-only memory (EPROM), electrically erasable programmable read-only memory (EEPROM), etc.), and volatile memory 62 (e.g., random-access memory (RAM)). A basic input/output system (BIOS) 64 may be stored in the non-volatile memory 60 and can include the basic routines that help to transfer information between elements within the compute instance 12. The volatile memory 62 may also include a high-speed RAM, such as static RAM, for caching data.

The compute instance 12 may further include or be coupled to a non-transitory computer-readable storage medium such as a storage device 66, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 66 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 66 and in the volatile memory 62, including an operating system and one or more program modules, such as the machine management system 20 and the OS updater 42, which may implement the functionality described herein in whole or in part.

All or a portion of the examples may be implemented as a computer program product 68 stored on a transitory or non-transitory computer-usable or computer-readable storage medium, such as the storage device 66, which includes complex programming instructions, such as complex computer-readable program code, to cause the processor device 16 to carry out the steps described herein. Thus, the computer-readable program code can comprise software instructions for implementing the functionality of the examples described herein when executed on the processor device 16. The processor device 16, in conjunction with the OS updater 42 in the volatile memory 62, may serve as a controller, or control system, for the compute instance 12 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the processor device 16 through an input device interface 70 that is coupled to the system bus 58 but can be connected by other interfaces such as a parallel port, an Institute of Electrical and Electronic Engineers (IEEE) 1394 serial port, a Universal Serial Bus (USB) port, an IR interface, and the like. The compute instance 12 may also include a communications interface 72 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
   determining that a first compute instance that boots from an operating system image on a first storage device is in an inactive state;
   accessing an automatic update indicator that indicates that the first compute instance is to be updated if updates to the operating system image on the first storage device exist;
   determining that updates to the operating system image on the first storage device exist;
   copying the operating system image from the first storage device to a second storage device based on the automatic update indicator;
   updating the operating system image on the second storage device with the updates to generate an updated operating system image on the second storage device; and
   copying the updated operating system image from the second storage device to the first storage device in place of the operating system image.

2. The method of claim 1 wherein the inactive state comprises one of a suspended state or a shutdown state.

3. The method of claim 1 wherein the first compute instance comprises a virtual machine or a bare metal machine.

4. The method of claim 1 wherein updating the operating system image on the second storage device further comprises:
    initiating a second compute instance from the operating system image on the second storage device; and
    initiating an update of the operating system image on the second storage device to generate the updated operating system image on the second storage device.

5. The method of claim 4 wherein the second compute instance comprises a virtual machine.

6. The method of claim 4 wherein initiating the update of the operating system image on the second storage device comprises issuing a YUM update command to a package manager of the operating system image on the second storage device.

7. The method of claim 1 wherein the inactive state comprises a powered off state, and further comprising sending instructions to a base management controller associated with the first compute instance to turn on power to the first storage device.

8. The method of claim 1 further comprising:
    after updating the operating system image on the second storage device and prior to copying the updated operating system image to the first storage device, accessing state information associated with the first compute instance; and
    based on the state information determining that the first compute instance remains in the inactive state.

9. The method of claim 1 further comprising:
    determining that a second compute instance that boots from an operating system image on a third storage device is in an inactive state;
    determining that updates to the operating system image on the third storage device exist;
    copying the operating system image from the third storage device to a fourth storage device;
    updating the operating system image on the fourth storage device with the updates to generate an updated operating system image on the fourth storage device;
    accessing state information associated with the second compute instance;
    based on the state information associated with the second compute instance determining that the second compute instance has changed from the inactive state to an active state; and
    in response to determining that the second compute instance has changed from the inactive state to the active state, canceling the updates to the operating system image on the third storage device by inhibiting the copying of the updated operating system image from the fourth storage device to the third storage device.

10. A computing device, comprising:
    a memory; and
    a processor device coupled to the memory to:
        determine that a first compute instance that boots from an operating system image on a first storage device is in an inactive state;
        access an automatic update indicator that indicates that the first compute instance is to be updated if updates to the operating system image on the first storage device exist;
        determine that updates to the operating system image on the first storage device exist;
        copy the operating system image from the first storage device to a second storage device based on the automatic update indicator;
        update the operating system image on the second storage device with the updates to generate an updated operating system image on the second storage device; and
        copy the updated operating system image from the second storage device to the first storage device in place of the operating system image.

11. The computing device of claim 10 wherein to update the operating system image on the second storage device, the processor device is further to:
    initiate a second compute instance from the operating system image on the second storage device; and
    initiate an update of the operating system image on the second storage device to generate the updated operating system image on the second storage device.

12. The computing device of claim 10 wherein the inactive state comprises a powered off state, and wherein the processor device is further to send instructions to a base management controller associated with the first compute instance to turn on power to the first storage device.

13. The computing device of claim 10 wherein the processor device is further to:
    after updating the operating system image on the second storage device and prior to copying the updated operating system image to the first storage device, access state information associated with the first compute instance; and
    based on the state information determine that the first compute instance remains in the inactive state.

14. A non-transitory computer program product stored on a computer-readable storage medium and including instructions configured to cause a processor device to:
    determine that a first compute instance that boots from an operating system image on a first storage device is in an inactive state;
    access an automatic update indicator that indicates that the first compute instance is to be updated if updates to the operating system image on the first storage device exist;
    determine that updates to the operating system image on the first storage device exist;
    copy the operating system image from the first storage device to a second storage device based on the automatic update indicator;
    update the operating system image on the second storage device with the updates to generate an updated operating system image on the second storage device; and
    copy the updated operating system image from the second storage device to the first storage device in place of the operating system image.

15. The computer program product of claim 14 wherein to update the operating system image on the second storage device, the instructions further cause the processor device to:
    initiate a second compute instance from the operating system image on the second storage device; and
    initiate an update of the operating system image on the second storage device to generate the updated operating system image on the second storage device.

16. The computer program product of claim 14 wherein the inactive state comprises a powered off state, and wherein the instructions further cause the processor device to send instructions to a base management controller associated with the first compute instance to turn on power to the first storage device.

17. The computer program product of claim 14 wherein the instructions further cause the processor device to:
   after updating the operating system image on the second storage device and prior to copying the updated operating system image to the first storage device, access state information associated with the first compute instance; and
   based on the state information determine that the first compute instance remains in the inactive state.

* * * * *